US010788055B2

(12) United States Patent
Diebold et al.

(10) Patent No.: US 10,788,055 B2
(45) Date of Patent: Sep. 29, 2020

(54) LARGE MANIPULATOR AND HYDRAULIC CIRCUIT ARRANGEMENT FOR A LARGE MANIPULATOR

(71) Applicant: Putzmeister Engineering GmbH, Aichtal (DE)

(72) Inventors: Martin Diebold, Reutlingen (DE); Werner Münzenmaier, Nürtingen (DE); Roman Zirbs, Weil der Stadt (DE)

(73) Assignee: Putzmeister Engineering GmbH, Aichtal (DE)

( * ) Notice: Subject to any disclaimer, the term of this patent is extended or adjusted under 35 U.S.C. 154(b) by 0 days.

(21) Appl. No.: 16/660,516

(22) Filed: Oct. 22, 2019

(65) Prior Publication Data

US 2020/0048919 A1 Feb. 13, 2020

Related U.S. Application Data

(63) Continuation of application No. PCT/EP2018/069400, filed on Jul. 17, 2018.

(30) Foreign Application Priority Data

Aug. 10, 2017 (DE) .................. 10 2017 118 274

(51) Int. Cl.
*F15B 11/024* (2006.01)
*F15B 11/00* (2006.01)
(Continued)

(52) U.S. Cl.
CPC ............. *F15B 11/003* (2013.01); *B25J 9/14* (2013.01); *F15B 11/024* (2013.01); *F15B 11/16* (2013.01);
(Continued)

(58) Field of Classification Search
CPC ................. F15B 11/003; F15B 11/024; F15B 2011/0243; F15B 11/16
See application file for complete search history.

(56) References Cited

U.S. PATENT DOCUMENTS 5,245,826 A 9/1993 Roth et al.
5,640,850 A * 6/1997 Benckert ................. E04G 21/04
137/884
(Continued)

FOREIGN PATENT DOCUMENTS

DE 41 29 509 A1 3/1993
DE 196 08 801 C2 6/2000
(Continued)

OTHER PUBLICATIONS

English translation of the International Search Report, PCT/EP2018/069400, Nov. 7, 2018, 2 pages.

*Primary Examiner* — Michael Leslie
(74) *Attorney, Agent, or Firm* — Bose McKinney & Evans LLP

(57) ABSTRACT

A manipulator for concrete pumps having an articulated boom with at least two boom arms and a hydraulic drive that pivots one or more of the boom arms. A hydraulic cylinder has piston and rod side working volumes. A hydraulic circuit has a first switching state in which the hydraulic circuit connects a first working port for feed or discharge of hydraulic fluid to the rod-side working volume and connects a second working port for feed or discharge of hydraulic fluid to the piston-side working volume. In a second switching state, the hydraulic circuit separates the first working port from the first fluid channel and thereby connects the first fluid channel to the second fluid channel for the feed of hydraulic fluid from the rod-side to the piston side working
(Continued)

volume. A sensor acquires an operating state variable based upon which an activation assembly sets the switching state.

11 Claims, 7 Drawing Sheets

(51) Int. Cl.
*B25J 9/14* (2006.01)
*F15B 11/16* (2006.01)
*E04G 21/04* (2006.01)

(52) U.S. Cl.
CPC ...... *E04G 21/0436* (2013.01); *E04G 21/0463* (2013.01); *F15B 2011/0243* (2013.01); *F15B 2211/205* (2013.01); *F15B 2211/3057* (2013.01); *F15B 2211/30515* (2013.01)

(56) References Cited

U.S. PATENT DOCUMENTS

| | | | |
|---|---|---|---|
| 6,883,532 B2 * | 4/2005 | Rau | B66C 13/066 137/1 |
| 7,487,707 B2 * | 2/2009 | Pfaff | F15B 11/003 91/437 |
| 7,617,760 B2 * | 11/2009 | Kraft | F15B 11/003 91/436 |
| 8,499,552 B2 * | 8/2013 | Kauss | F15B 11/024 60/327 |
| 2003/0196506 A1 | 10/2003 | Rau | |
| 2004/0076502 A1 | 4/2004 | Nissing et al. | |
| 2010/0186401 A1 | 7/2010 | Kauss et al. | |

FOREIGN PATENT DOCUMENTS

| | | |
|---|---|---|
| DE | 101 01 570 A1 | 8/2002 |
| DE | 10 2007 029 358 A1 | 1/2009 |
| DE | 20 2009 007 668 U1 | 9/2009 |
| EP | 1 319 110 A1 | 6/2003 |
| EP | 1 319 110 B1 | 3/2008 |
| JP | 2013-40641 A | 2/2013 |
| WO | WO 02/25036 A1 | 3/2002 |

* cited by examiner

LARGE MANIPULATOR AND HYDRAULIC CIRCUIT ARRANGEMENT FOR A LARGE MANIPULATOR

RELATED APPLICATIONS

This application is a continuation of PCT/EP2018/069400, filed Jul. 17, 2018, which claims priority to DE 10 2017 118 274.8, filed Aug. 10, 2017, the entire disclosures of each of which are hereby incorporated herein by reference.

BACKGROUND

This disclosure relates to a large manipulator for concrete pumps that have a boom pedestal arranged on a frame and rotatable about a vertical axis of rotation, and that also have an articulated boom made up of at least two boom arms bearing a concrete conveying line, and having at least one hydraulic drive unit for pivoting at least one of the boom arms about a horizontal axis of rotation. At least one hydraulic drive unit has a hydraulic cylinder and a piston arranged movably in the hydraulic cylinder and has a piston rod connected thereto, wherein, in the hydraulic cylinder, there are formed a piston-side working volume, which can be charged with hydraulic fluid, and a rod-side working volume, which can be charged with hydraulic fluid. This disclosure furthermore relates to a hydraulic circuit arrangement for a large manipulator and to a method for operating a large manipulator.

A large manipulator of the above-mentioned type is known from EP 1 319 110 B1 and WO 02/25036 A1. Said large manipulator has a distributor boom with an articulated boom made up of boom arms, wherein the boom arms are pivotable about in each case horizontal, mutually parallel articulation axes by means of in each case one hydraulic drive unit in the form of a linear motor with a hydraulic cylinder. Said large manipulator comprises a control device for the boom movement by means of actuating elements assigned to the individual drive units.

DE 10 2007 029 358 A1 describes a hydraulic circuit for an excavator or a telehandler, which hydraulic circuits serves for the activation of a hydraulic cylinder. Said hydraulic circuit comprises directional valves which act as a bypass valve and which are activatable in a manner dependent on a hydraulic cylinder movement direction.

JP 2013-040641 has disclosed a hydraulic circuit for an excavator in the case of which the setting of a bypass valve is performed in a manner dependent on the pressure in the annular space of the hydraulic cylinder and in a manner dependent on the pressure in an annular space of the hydraulic cylinder or in a manner dependent on the pressure in hydraulic lines.

For the fast adjustment of the boom arms in the articulated booms of known large manipulators, it is necessary for very large amounts of hydraulic fluid to be moved at a high flow speed. In large manipulators which have long articulated booms with numerous boom arms, it is therefore necessary to provide high-powered hydraulic pumps and large tanks for hydraulic fluid. The consequence is that such large manipulators are very heavy.

SUMMARY

This disclosure teaches a large manipulator for concrete pumps which makes it possible, for the adjustment of the boom arms in an articulated boom, to move a smaller amount of hydraulic fluid and to use hydraulic pumps with reduced power, without the functionality of the large manipulator thus being impaired.

This disclosure proposes that a large manipulator for concrete pumps has a boom pedestal which is arranged on a frame and which is rotatable about a vertical axis of rotation and an articulated boom which is made up of at least two boom arms and which bears a concrete conveying line. In a large manipulator according to this disclosure for concrete pumps, there is at least one hydraulic drive unit for pivoting at least one of the boom arms about a horizontal axis of rotation, which at least one hydraulic drive unit has a hydraulic cylinder and a piston which is arranged movably in the hydraulic cylinder and which has a piston rod connected thereto, wherein, in the hydraulic cylinder, there are formed a piston-side working volume, which can be charged with hydraulic fluid, and a rod-side working volume, which can be charged with hydraulic fluid. A large manipulator according to this disclosure comprises a hydraulic circuit arrangement for driving the at least one hydraulic drive unit, which hydraulic circuit arrangement, in a first switching state, connects a first working port for the feed or discharge of the hydraulic fluid by means of a first fluid channel to the rod-side working volume and a second working port for the feed or discharge of the hydraulic fluid by means of a second fluid channel to the piston-side working volume, and which hydraulic circuit arrangement, in a second switching state which differs from the first switching state, separates the first working port from the first fluid channel and in so doing connects the first fluid channel to the second fluid channel for the feed of hydraulic fluid from the rod-side working volume into the piston-side working volume.

In this way, it is possible for a large manipulator to be of more lightweight construction, because it is thus possible for the amount of hydraulic fluid that must be carried in a large manipulator to be reduced, and for correspondingly smaller hydraulic pumps to be used for the movement of the hydraulic fluid in the large manipulator, which hydraulic pumps have a lower weight.

A large manipulator according to this disclosure has at least one operating state acquisition device for acquiring at least one operating state variable of the large manipulator, and comprises an activation assembly for setting the switching state of the at least one hydraulic circuit arrangement in a manner dependent on the at least one operating state variable of the large manipulator as acquired by means of the operating state acquisition device, and a device for feeding an operating state variable of the large manipulator as acquired by means of the operating state acquisition device to the activation assembly for the setting of the switching state of the at least one hydraulic circuit arrangement in a manner dependent on the operating state.

Here, the at least one operating state acquisition device is designed to acquire at least one operating state variable of the large manipulator from the group comprising articulated boom posture and angular position of a boom arm.

The at least one operating state acquisition device may also additionally be designed to acquire at least one operating state variable of the large manipulator from the group comprising articulated boom movement state, articulated boom loading, loading of a boom arm of the articulated boom, concrete pump operating state, hydraulic pressure in the rod-side working volume of the hydraulic cylinder of the at least one hydraulic drive unit, hydraulic pressure in the piston-side working volume of the hydraulic cylinder of the at least one hydraulic drive unit.

Here, the at least one operating state acquisition device for acquiring at least one operating state variable of the large manipulator may be designed as a pressure transducer for acquiring the hydraulic pressure in a portion of the first fluid channel which is open to the rod-side working volume of the hydraulic cylinder. In particular, the operating state acquisition device may acquire the hydraulic pressure in a portion of the second fluid channel which is open to the piston-side working volume of the hydraulic cylinder.

In this way, it is possible to set the amount of hydraulic fluid that is moved for the adjustment of the large manipulator in a manner dependent on a mechanical loading of the drive units in the large manipulator.

In a large manipulator according to this disclosure, provision may be made in particular whereby the hydraulic circuit arrangement comprises:

A first lowering brake valve, which first lowering brake valve is hydraulically activated by means of a first pressure control line which communicates with the second working port for the feed or discharge of the hydraulic fluid, and which first lowering brake valve is preloaded into a first switching position, and which first lowering brake valve, in the first switching position, opens up the first fluid channel if the hydraulic pressure in the first pressure control line overshoots a threshold value, and which first lowering brake valve, in at least one second switching position which differs from the first switching position, shuts off the first fluid channel if the hydraulic pressure in the pressure control line falls below the threshold value.

A first check valve which is arranged in parallel with respect to the first lowering brake valve and which prevents the backflow of hydraulic fluid out of the rod-side working volume of the hydraulic cylinder.

A second lowering brake valve, which second lowering brake valve is hydraulically activated by means of a further pressure control line which communicates with the first fluid channel on a side of the first lowering brake valve averted from the rod-side working volume, and which second lowering brake valve is preloaded into a first switching position, and which second lowering brake valve opens up the second fluid channel if the hydraulic pressure in the further pressure control line overshoots a threshold value, and which second lowering brake valve, in at least one second switching position which differs from the first switching position, shuts off the second fluid channel if the hydraulic pressure in the further pressure control line falls below the threshold value.

A second check valve which is arranged in parallel with respect to the second lowering brake valve and which prevents the backflow of hydraulic fluid out of the piston-side working volume of the hydraulic cylinder to the second working port for the feed or discharge of the hydraulic fluid.

A bypass valve, which bypass valve, in a first switching state, connects the first fluid channel to the first working port for the feed or discharge of the hydraulic fluid, and in so doing separates the first fluid channel from the second fluid channel, and which bypass valve, in a second switching state which differs from the first switching state, connects the first fluid channel on that side of the second lowering brake valve which is averted from the piston-side working volume to the second fluid channel, and in so doing separates the first fluid channel from the first working port for the feed or discharge of the hydraulic working medium.

The first lowering brake valve may comprise a throttle integrated therein. In the first switching position, the first lowering brake valve then, by means of the throttle integrated therein, opens up the first fluid channel if the hydraulic pressure in the first pressure control line overshoots a threshold value.

By means of the throttle integrated into the first lowering brake valve, the hydraulic fluid that emerges from the rod-side working volume of the hydraulic cylinder in the first switching position of the first lowering brake valve is preloaded. The preloading of the hydraulic fluid that emerges from the rod-side working volume of the hydraulic cylinder in the first switching position of the lowering brake valve has the effect that pressure fluctuations in the hydraulic circuitry are counteracted, such that oscillatory movements of the piston rod are prevented or at least minimized. By contrast, in a second switching position that differs from the first switching position, the first lowering brake valve shuts off the first fluid channel.

Correspondingly, the second lowering brake valve may have a throttle integrated therein. In the first switching position, the second lowering brake valve, by means of a throttle integrated therein, opens up the second fluid channel if the hydraulic pressure in the further pressure control line overshoots a threshold value. By means of the throttle integrated into the second lowering brake valve, the hydraulic fluid that emerges from the piston-side working volume of the hydraulic cylinder in the first switching position of the second lowering brake valve is preloaded.

The preloading of the hydraulic fluid that emerges from the piston-side working volume of the hydraulic cylinder in the first switching position of the second lowering brake valve likewise has the effect that pressure oscillations in the hydraulic circuitry are counteracted, such that oscillatory movements of the piston rod are prevented or at least minimized. By contrast, in a second switching position that differs from the at least one first switching position, the second lowering brake valve shuts off the second fluid channel.

It is to be noted that provision may be made for the throttle cross section of the throttle integrated into the lowering brake valves to be designed to be adjustable and to be set in a manner dependent on the switching state of the bypass valve such that the throttle cross section of the throttle integrated into the lowering brake valves is smaller in the first switching state of the bypass valve than in the second switching state of the bypass valve, if the lowering brake valves have been switched into the first switching state. In this way, it can be achieved that the preloading of the hydraulic fluid that emerges from the piston-side or rod-side working volume does not increase or increases only a small amount if the bypass valve connects the first fluid channel on that side of the second lowering brake valve which is averted from the piston-side working volume to the second fluid channel, and in so doing separates the first fluid channel from the first working port for the feed or discharge of the hydraulic working medium.

It is advantageous if the bypass valve has an electric drive or a hydraulic drive or a pneumatic drive or a mechanical drive for the setting of the first switching state and of the second switching state. Here, the bypass valve may be mechanically or hydraulically or pneumatically or electrically preloaded into the first switching state.

Here, an electric drive is to be understood in the present case to mean an electric motor which serves for the setting of the switching state of the bypass valve. A pneumatic drive is for example a pneumatic linear motor with a pneumatic cylinder, by means of which the bypass valve can be adjusted. A hydraulic drive is for example a hydraulic motor for the setting of the bypass valve. A mechanical drive is to be understood in the present case to mean a mechanism which, by means of a linkage or a cam track, effects the setting of the switching state of the bypass valve at particular joint angles of the articulated boom.

In a large manipulator according to this disclosure, the hydraulic circuit arrangement preferably has an overpressure port and a first overpressure valve, which connects the first fluid channel on that side of the first lowering brake valve which faces toward the rod-side working volume of the hydraulic cylinder to the overpressure port in the presence of an overpressure of the hydraulic working medium, and a second overpressure valve, which connects the second fluid channel on that side of the first lowering brake valve which faces toward the piston-side working volume of the hydraulic cylinder to the overpressure port in the presence of an overpressure of the hydraulic working medium.

A hydraulic circuit arrangement according to this disclosure has a first working port and a second working port for the feed or discharge of hydraulic fluid for driving at least one hydraulic drive unit for pivoting at least one boom arm in a large manipulator for concrete pumps, which large manipulator comprises a boom pedestal arranged on a frame and rotatable about a vertical axis of rotation and comprises an articulated boom which is held on the boom pedestal and which is made up of at least two boom arms and which bears a concrete conveying line. Here, the hydraulic drive unit has a hydraulic cylinder and a piston which is arranged movably in the hydraulic cylinder and which has a piston rod connected thereto, wherein, in the hydraulic cylinder, there are formed a piston-side working volume, which can be charged with hydraulic fluid, and a rod-side working volume, which can be charged with hydraulic fluid. In the hydraulic circuit arrangement, there are a first lowering brake valve, which first lowering brake valve is hydraulically activated by means of a pressure control line which communicates with the second working port for the feed or discharge of the hydraulic fluid, and which first lowering brake valve is mechanically preloaded into a first switching position, and which first lowering brake valve opens up a first fluid channel if the hydraulic pressure in the first pressure control line overshoots a threshold value, and which first lowering brake valve, in at least one second switching position which differs from the first switching position, shuts off the first fluid channel if the hydraulic pressure in the pressure control line falls below the threshold value, a first check valve which is arranged in parallel with respect to the first lowering brake valve and which prevents the backflow of hydraulic fluid out of the rod-side working volume of the hydraulic cylinder, a second lowering brake valve, which second lowering brake valve is hydraulically activated by means of a pressure control line which communicates with the first fluid channel on a side of the first lowering brake valve averted from the rod-side working volume, and which second lowering brake valve is mechanically preloaded into a first switching position, and which second lowering brake valve opens up a second fluid channel if the hydraulic pressure in the pressure control line overshoots a threshold value, and which second lowering brake valve, in a second switching position which differs from the first switching position, shuts off the second fluid channel if the hydraulic pressure in the pressure control line falls below the threshold value, a second check valve which is arranged in parallel with respect to the second lowering brake valve and which prevents the backflow of hydraulic fluid out of the piston-side working volume of the hydraulic cylinder to the second working port for the feed or discharge of the hydraulic fluid, and a bypass valve, which bypass valve, in a first switching state, connects the first fluid channel to the first working port for the feed or discharge of the hydraulic fluid, and in so doing separates the first fluid channel from the second fluid channel, and which bypass valve, in a second switching state which differs from the first switching state, connects the first fluid channel on that side of the second lowering brake valve which is averted from the piston-side working volume to the second fluid channel, and in so doing separates the first fluid channel from the first working port for the feed or discharge of the hydraulic working medium.

Here, the bypass valve may have an electric drive or a hydraulic drive or a pneumatic drive or a mechanical drive for the setting of the first switching state and of the second switching state. In particular, the bypass valve may be mechanically preloaded into the first switching state.

The hydraulic circuit arrangement may have an overpressure port and a first overpressure valve, which connects the first fluid channel on that side of the first lowering brake valve which faces toward the rod-side working volume of the hydraulic cylinder to the overpressure port in the presence of an overpressure of the hydraulic working medium, and a second overpressure valve, which connects the second fluid channel on that side of the first lowering brake valve which faces toward the piston-side working volume of the hydraulic cylinder to the overpressure port in the presence of an overpressure of the hydraulic working medium.

The method according to this disclosure for operating a large manipulator for concrete pumps, said large manipulator having a boom pedestal which is arranged on a frame and which is rotatable about a vertical axis of rotation, having an articulated boom which is made up of at least two boom arms and which bears a concrete conveying line, and having at least one hydraulic drive unit for pivoting at least one of the boom arms about a horizontal axis of rotation, which at least one hydraulic drive unit has a hydraulic cylinder and a piston which is arranged movably in the hydraulic cylinder and which has a piston rod connected thereto, wherein, in the hydraulic cylinder, there are formed a rod-side working volume, which can be charged with hydraulic fluid by means of a first fluid channel, and a piston-side working volume, which can be charged with hydraulic fluid by means of a second fluid channel, provides that at least one operating state variable of the large manipulator is acquired and, in a manner dependent on the acquired operating state variable, either the first fluid channel is connected to a first working port for the feed or discharge of the hydraulic fluid, and in the process the first fluid channel is separated from the second fluid channel, or the first fluid channel is connected to the second fluid channel, and in the process the first fluid channel is separated from the first working port for the feed or discharge of the hydraulic working medium.

Here, the at least one acquired operating state variable of the large manipulator is an operating state variable from the group comprising articulated boom posture and angular position of a boom arm.

It is additionally also possible for an operating state variable of the large manipulator from the group comprising articulated boom movement state, articulated boom loading, loading of a boom arm of the articulated boom, concrete pump operating state, hydraulic pressure in the rod-side working volume of the hydraulic cylinder of the at least one hydraulic drive unit, hydraulic pressure in the piston-side working volume of the hydraulic cylinder of the at least one hydraulic drive unit to be acquired as an operating state variable, in a manner dependent on which the first fluid channel is separated from the second fluid channel or the first fluid channel is connected to the second fluid channel and in the process the first fluid channel is separated from the first working port for the feed or discharge of the hydraulic working medium.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

It shall be understood that in this disclosure terms such as "vertical," "parallel," "horizontal," "right angle," "rectangular," "circular," and the like are not used to connote exact mathematical orientations or geometries, unless explicitly stated, but are instead used as terms of approximation. Further, these terms are generally used herein to establish positions of individual components relative to one another rather than an absolute angular position in space. With this understanding, the term "vertical," for example, certainly includes a structure that is positioned exactly 90 degrees from horizontal, but should generally be understood as meaning positioned up and down rather than side to side. Other terms used herein to connote orientation, position or shape should be similarly interpreted. Further, it should be understood that various structural terms used throughout this disclosure and claims should not receive a singular interpretation unless it is made explicit herein. By way of non-limiting example, the terms "boom arm," "hydraulic drive," "piston," and "operating state variable," to name only a few, should be interpreted when appearing in this disclosure and claims to mean "one or more" or "at least one." All other terms used herein should be similarly interpreted unless it is made explicit that a singular interpretation is intended.

Figure 1:
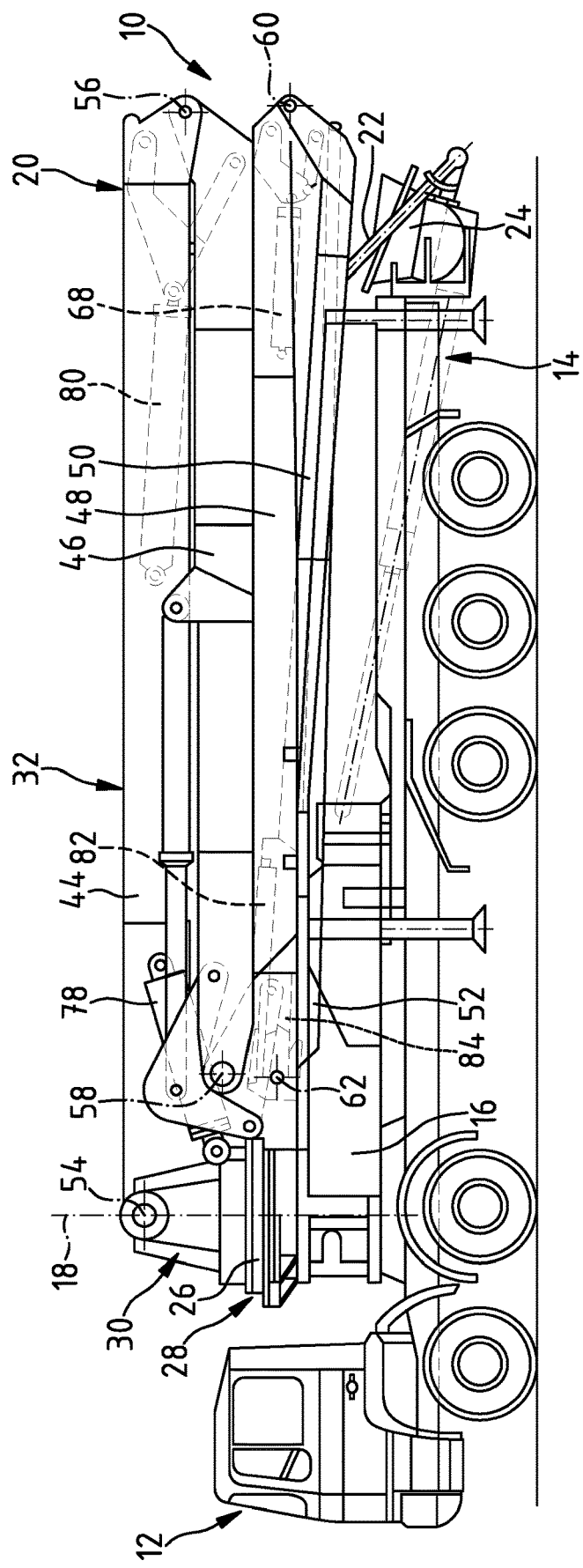
FIG. 1 shows a side view of a mobile concrete pump with a folded-together distributor boom.
Figure 2:
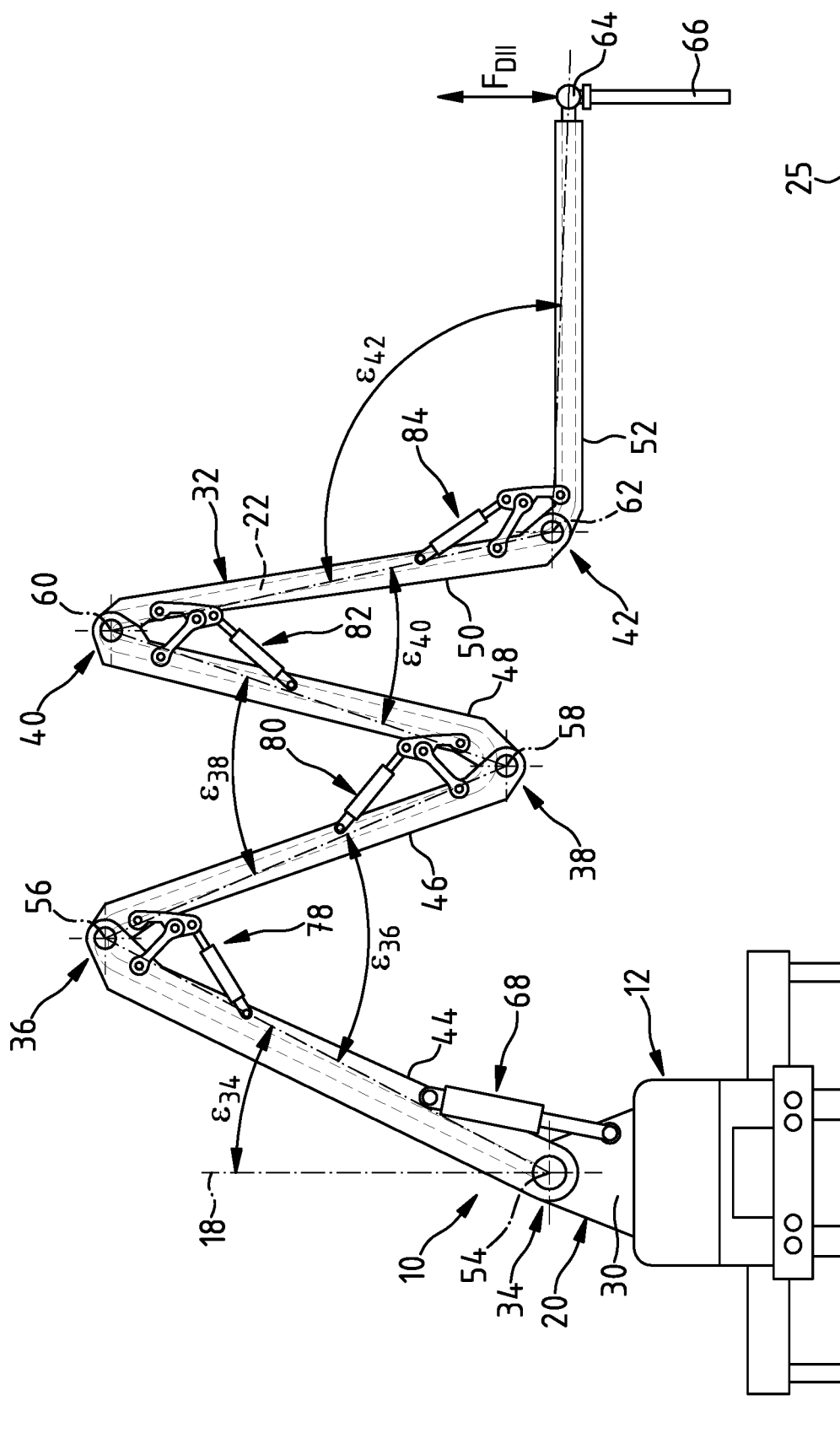
FIG. 2 shows the mobile concrete pump with the distributor boom in an unfolded position.

The mobile concrete pump 10 shown in FIG. 1 comprises a transport vehicle 12 and comprises a pulsing thick-matter pump 14, which is designed for example as a two-cylinder piston pump, and a large manipulator with a distributor boom 20 which is held on a frame 16 fixed with respect to the vehicle and which is rotatable about a vertical axis 18, which is fixed with respect to the vehicle, at a rotary joint 28. The distributor boom 20 bears a concrete conveying line 22. As can be seen in FIG. 2, via the conveying line 22, liquid concrete that is introduced continuously into a feed hopper 24 during the concreting process can be conveyed to a concreting location 25 arranged remote from the location of the vehicle 12.

The distributor boom 20 comprises a rotatable boom pedestal 30 which can be rotated by means of a drive unit 26, which is in the form of a hydraulic rotary drive, about the vertical axis 18, which acts as an axis of rotation, of the rotary joint 28. The distributor boom 20 comprises an articulated boom 32 which is pivotable on the boom pedestal 30 and which is continuously adjustable for a variable range and height difference between the vehicle 12 and the concreting location 25. In the exemplary embodiment illustrated, the articulated boom 32 has five boom arms 44, 46, 48, 50, 52 which are connected to one another in articulated fashion by means of articulated joints 34, 36, 38, 40, 42 and which are pivotable about joint axes 54, 56, 58, 60, 62 running parallel to one another and at right angles to the vertical axis 18 of the boom pedestal 30. For the movement of the boom arms about the joint axes 54, 56, 58, 60 and 62 of the articulated joints 34, 36, 38, 40, 42, the large manipulator has drive units 68, 78, 80, 82 and 84 assigned to the articulated joints. The arrangement of the articulated joints 34, 36, 38, 40, 42 and the articulation angles $\varepsilon_i$, i=34, 36, 38, 40, 42 (FIG. 2), about the joint axes 54, 56, 58, 60, 62 that can be set in the distributor boom by adjustment of the articulated joints make it possible for the distributor boom 20 to be stowed on the vehicle 12 in the space-saving transport configuration corresponding to a multiply folded configuration shown in FIG. 1.

The articulated boom 32 has a boom tip 64, on which there is arranged an end hose 66 through which liquid concrete can be discharged from the conveying line 22 of the distributor boom 20 to the concreting location 25.

Figure 3:
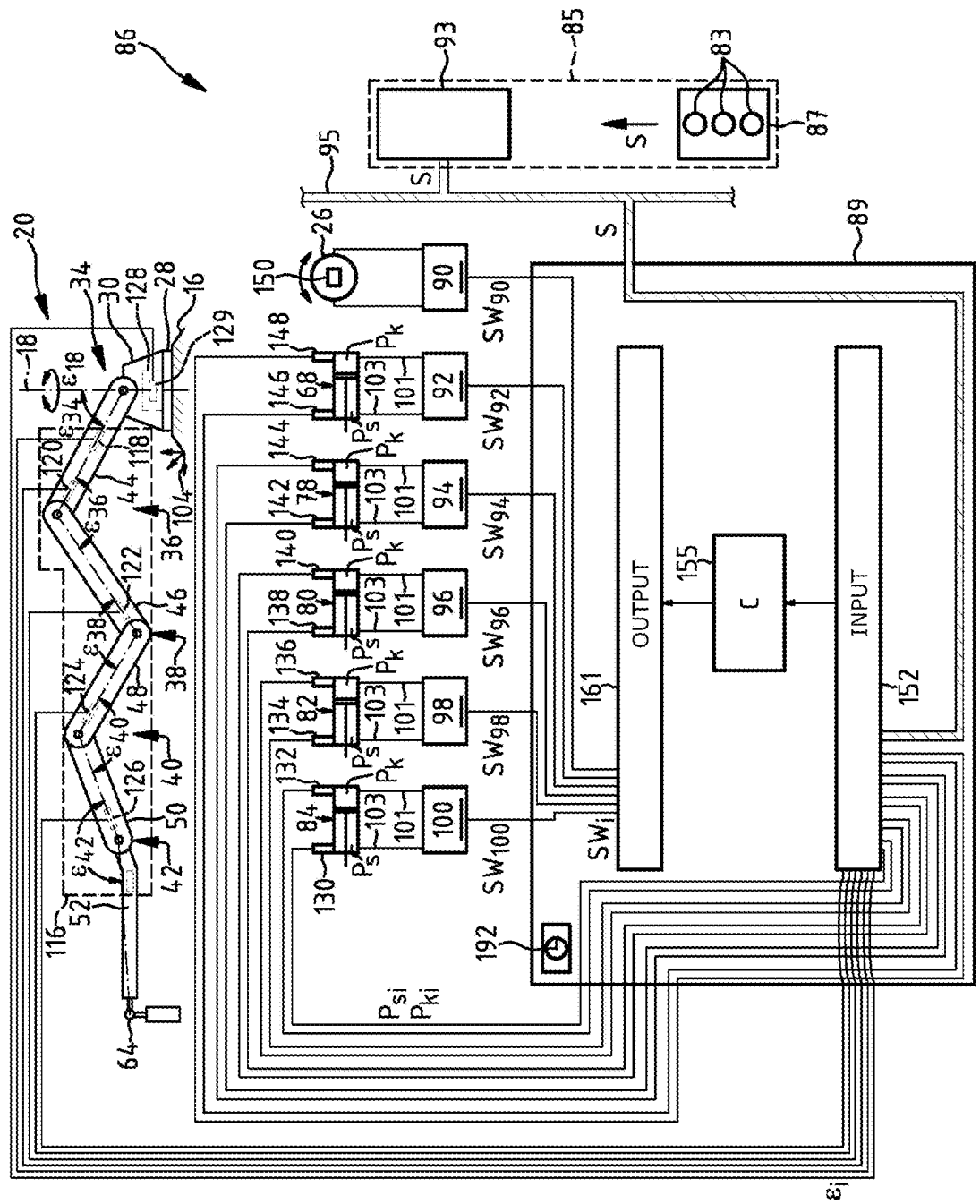
FIG. 3 shows a control device for the control of hydraulic drive units of the mobile concrete pump.

In order to control the movement of the boom arms of the articulated boom 32, the large manipulator has a control device (also referred to as a "controller") 86, which will be discussed below on the basis of FIG. 3. The control device 86 controls the movement of the articulated boom 32 shown in FIG. 2 by means of actuating elements (also referred to herein as "actuators") 90, 92, 94, 96, 98, 100 with hydraulic circuit arrangements for the drive units (drives) 26, 68, 78, 80, 82 and 84 assigned to the articulated joints 34, 36, 38, 40, 42 and the rotary joint 28.

By means of program-controlled activation of the hydraulic drive units 26, 68, 78, 80, 82 and 84 that are individually assigned to the joint axes 54, 56, 58, 60 and 62 and the axis of rotation 18, the articulated boom 32 can be unfolded so as to cover different distances and/or height differences between the concreting location 25 and the vehicle location.

The boom controller controls the distributor boom 20 for example by means of a control assembly 85 with a control unit 87. The control unit 87 is designed as a remote controller and comprises operator control elements 83 for the adjustment of the distributor boom 20 with the articulated boom 32, which remote controller generates control signals S which can be fed to an activation assembly 89 for the activation of the actuating elements 90, 92, 94, 96, 98, 100 in the large manipulator.

The control signals S are transmitted via a radio path 91 to a radio receiver 93 which is fixed with respect to the vehicle and which, at the output side, is connected via a bus system 95, which is designed for example as a CAN bus, to the activation assembly 89.

The control device 86 comprises a first operating state acquisition device 116 for acquiring an operating state variable of the large manipulator, which operating state acquisition device has angle sensors 118, 120, 122, 124, 126 and 199 for determining the joint angles $\varepsilon_i$, i=34, 36, 38, 40, 42 of the articulated joints 34 and a device 128 for determining the rotational angle $\varepsilon_i$, i=18 about the vertical axis 18 of the rotary joint 28 with an angle sensor 129.

In the control device 86, there are further operating state acquisition devices 130, 132, 134, 136, 138, 140, 142, 144, 146, 148 which are assigned to the hydraulic drive units 26, 68, 78, 80, 82 and 84. The operating state acquisition devices 130, 132, 134, 136, 138, 140, 142, 144, 146, 148 are pressure transducers which convert an acquired hydraulic pressure of the hydraulic fluid into an electrical current. The operating state acquisition devices 130, 132, 134, 136, 138, 140, 142, 144, 146, 148 serve for measuring the rod-side pressure $p_{Si}$, i=130, 134, 138, 142, 146 and the piston-side pressure $p_{Ki}$ i=132, 136, 140, 144, 148 of the hydraulic fluid in the hydraulic cylinders 154. The operating state acquisition devices 130, 132, 134, 136, 138, 140, 142, 144, 146, 148 permit the determination of the actual force $F_i$, i=68, 78, 80, 82, 84 that is generated by means of the drive units 68, 78, 80, 82 and 84 and introduced into the boom arms 44, 46, 48, 50, 52 of the articulated boom 32.

The term "operating state acquisition device" is also referred to herein as a "sensor." As discussed above and elsewhere, the sensor can be a pressure transducer, measuring piston side and rod side pressure. As discussed below, sensors such as angle sensors may determine the angle of the articulated joints. The term "sensor" shall be understood as a broad term covering these and other sensing and transducing functions.

For the drive unit 26 in the form of a hydraulic rotary drive, the control device 86 has a torque sensor 150 which is designed for acquiring the actual moment $M_i$, i=18 that is introduced as a torque into the boom pedestal 30 by means of the rotary drive. It is to be noted that, for acquiring the actual moment $M_i$, i=18 that is introduced as a torque into the boom pedestal 30 by means of the rotary drive, it is also possible for a pressure sensor arrangement to be provided which is connected to the hydraulic rotary drive and which determines the hydraulic pressure of the hydraulic fluid in the hydraulic rotary drive.

Figure 4:
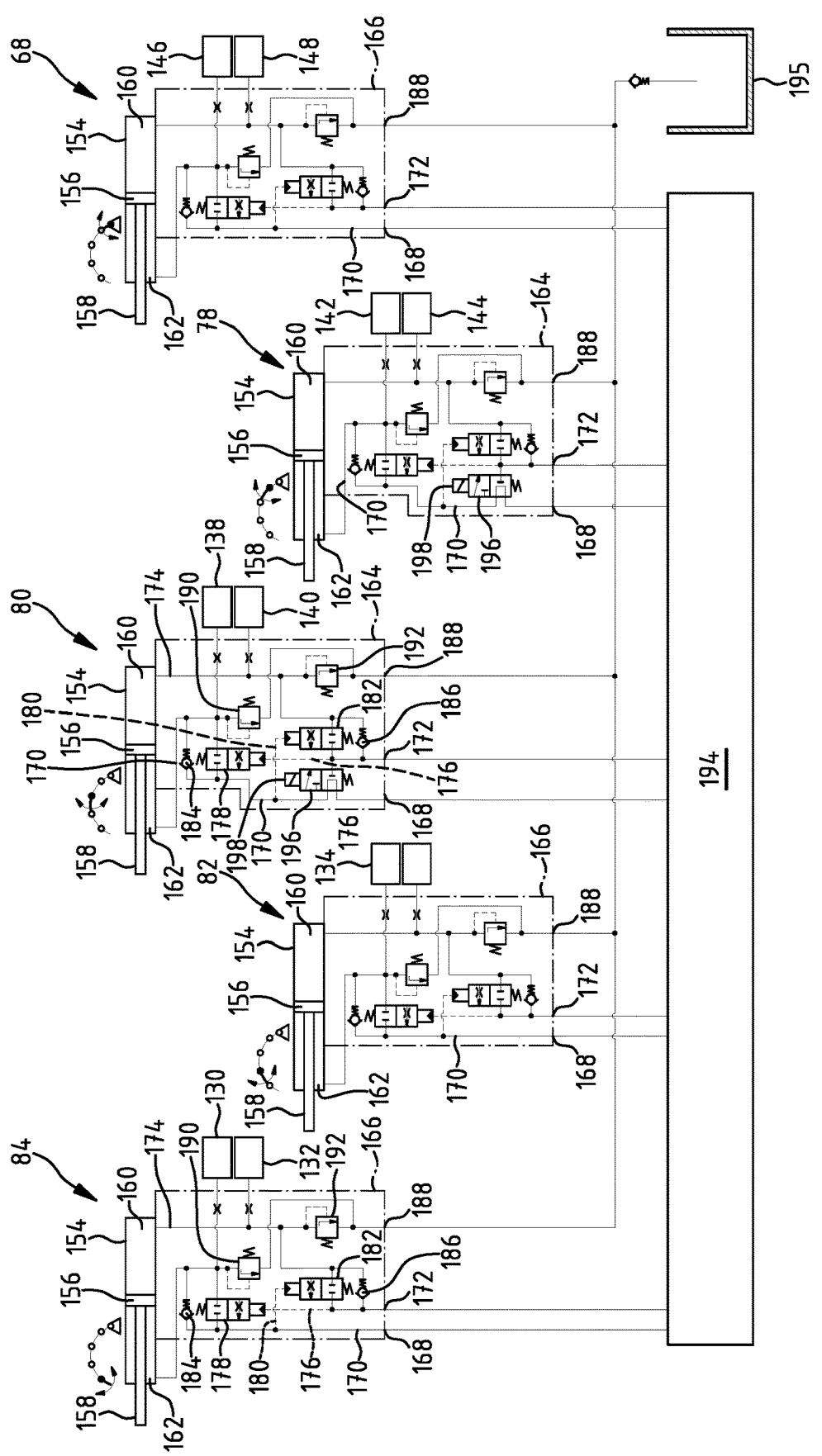
FIG. 4 shows hydraulic circuitry with hydraulic circuit arrangements for driving the hydraulic drive units.

The technical function of the activation assembly 89 is in particular that of setting hydraulic circuit arrangements 164, 166, shown in FIG. 4, of the actuating elements 90, 92, 94, 96, 98, 100 for driving the drive units 26, 68, 78, 80, 82 and 84.

On the basis of the control signals S from the control assembly 85, the activation assembly 89 generates actuation signals $SW_i$, i=90, 92, 94, 96, 98 and 100 for the actuating elements of the drive units of the distributor boom 20. Through evaluation of the setting of the joint angles $\varepsilon_i$, i=34, 36, 38, 40, 42, acquired by means of the angle sensors 118, 120, 122, 124 and 126 in the operating state acquisition device 116, of the articulated joints 34, 36, 38, 40, 42 and of the rotary angle $\varepsilon_i$, i=18, acquired by means of the angle sensor 129, of the boom pedestal 30 about the axis of rotation 18, the postures of the distributor boom 20 are set to setpoint values $W_{Soll}$, which are predefinable by means of the control assembly 85, through activation of the actuating elements 90, 92, 94, 96, 98, 100.

Here, the activation of the actuating elements 90, 92, 94, 96, 98, 100 is performed in a manner dependent on the joint angles $\varepsilon_i$, i=34, 36, 38, 40, 42, acquired by means of the operating state acquisition device 116, of the articulated joints 34, 36, 38, 40, 42 and the rod-side pressures $p_{Si}$, i=130, 134, 138, 142, 146 and piston-side pressures $p_{Ki}$ i=132, 136, 140, 144, 148, acquired by means of the further operating state acquisition devices, of the hydraulic fluid in the hydraulic cylinders.

The activation assembly 89 has an input routine 152 by means of which the operating state acquisition device 116 is continuously interrogated for the determination of the joint angles $\varepsilon_i$, i=18 of the articulated joints 34, 36, 38, 40, 42 by means of the angle sensors 118, 120, 122, 124 and 126 and the device 128 is continuously interrogated for the determination of the angle of rotation $\varepsilon_i$, i=18 about the vertical axis 18 of the rotary joint 28 by means of the angle sensor 129. The input routine 152 also continuously receives the signals $p_{Si}$, $p_{Ki}$ of the operating state acquisition devices 130, 132, 134, 136, 138, 140, 142, 144, 146, 148 designed as pressure transducers. By means of the input routine 152, it is furthermore the case that the control signals S are read in from the control assembly 85.

The activation assembly 89 comprises a processing routine 155 in which the continuously fed operating state variables of the large manipulator and the control signals S of the activation assembly 89 are processed to form actuating signals $SW_i$, i=90, 92, 94, 96, 98, 100 for the actuating elements 90, 92, 94, 96, 98 and 100.

By means of an output routine 161, the actuating signals $SW_i$, i=90, 92, 94, 96, 98, 100 for the actuating elements 90, 92, 94, 96, 98 and 100 are then output to the actuating elements 90, 92, 94, 96, 98 and 100 in the large manipulator.

FIG. 4 shows hydraulic circuitry with hydraulic circuit arrangements 164, 166 of the actuating elements 92, 94, 96, 98, 100 for driving the hydraulic drive units 68, 78, 80, 82 and 84. The drive units 68, 78, 80, 82 and 84 have in each case one hydraulic cylinder 154 and one piston 156 which is arranged movably in the hydraulic cylinder 154 and which has a piston rod 158 connected thereto. In the hydraulic cylinder 154 there are formed a piston-side working volume 160, which can be charged with hydraulic fluid, and a rod-side working volume 162, which can be charged with hydraulic fluid.

The hydraulic circuit arrangements 164, 166 of the actuating elements 92, 94, 96, 98, 100 for the hydraulic drive units 68, 78, 80, 82 and 84 have in each case one first working port 168 for the feed or discharge of the hydraulic fluid by means of a first fluid channel 170 which is connected to the rod-side working volume 162. The hydraulic circuit arrangements 164, 166 furthermore have in each case one second working port 172 which serves for the feed or discharge of the hydraulic fluid by means of a second fluid channel 174, which is connected to the piston-side working volume 160. The hydraulic circuit arrangements 164, 166 of the actuating elements 92, 94, 96, 98, 100 furthermore comprise in each case one first lowering brake valve 178, which is mechanically preloaded by means of spring force and which is hydraulically activated by means of a first pressure control line 176, and one second lowering brake valve 182, which is mechanically preloaded by means of spring force and which is hydraulically activated by means of a further pressure control line 180. Here, the first pressure control line 176 in the hydraulic circuit arrangements 164, 166 communicates with the in each case second working port 172. The further pressure control line 180 is connected, on a side of the first lowering brake valve 178 which is averted from the rod-side working volume 162, to the first fluid channel 170.

In at least one first switching position, the first lowering brake valve 178, by means of a throttle integrated therein, opens up the first fluid channel 170 if the hydraulic pressure in the first pressure control line 176 overshoots a threshold value. By means of the throttle integrated into the first lowering brake valve 178, the hydraulic fluid that emerges from the rod-side working volume 162 of the hydraulic cylinder 154 in the first switching position of the first lowering brake valve 178 is preloaded. The preloading of the hydraulic fluid that emerges from the rod-side working volume 162 of the hydraulic cylinder 154 in the first switching position of the lowering brake valve 178 has the effect that pressure fluctuations in the hydraulic circuitry are counteracted, such that oscillatory movements of the piston rod 158 are prevented or at least minimized. By contrast, in a second switching position that differs from the at least one first switching position, the first lowering brake valve 178 shuts off the first fluid channel 170.

Correspondingly, in at least one first switching position, the second lowering brake valve 182, by means of a throttle integrated therein, opens up the second fluid channel 174 if the hydraulic pressure in the further pressure control line 180 overshoots a threshold value. By means of the throttle integrated into the second lowering brake valve 182, the hydraulic fluid that emerges from the piston-side working volume 160 of the hydraulic cylinder 154 in the first switching position of the second lowering brake valve 182 is preloaded. The preloading of the hydraulic fluid that emerges from the piston-side working volume 160 of the hydraulic cylinder 154 in the first switching position of the second lowering brake valve 182 likewise has the effect that pressure oscillations in the hydraulic circuitry are counteracted, such that oscillatory movements of the piston rod 158 are prevented or at least minimized. By contrast, in a second switching position that differs from the at least one first switching position, the second lowering brake valve 182 shuts off the second fluid channel 174.

In the hydraulic circuit arrangements 164, 166 of the actuating elements 92, 94, 96, 98, 100, there is in each case one first check valve 184, which is arranged in parallel with respect to the first lowering brake valve 178 and which prevents the backflow of hydraulic fluid out of the rod-side working volume 162 of the hydraulic cylinder 154, and one second check valve 186, which is arranged in parallel with respect to the second lowering brake valve 182 and which prevents the backflow of hydraulic fluid out of the piston-side working volume 160 of the hydraulic cylinder 154.

The hydraulic circuit arrangements 164, 166 of the actuating elements 92, 94, 96, 98, 100 have in each case one overpressure port 188 and one first overpressure valve 190, which connects the first fluid channel 170 on that side of the first lowering brake valve 178 which faces toward the rod-side working volume 162 of the hydraulic cylinder 154 to the overpressure port 188 in the presence of an overpressure of the hydraulic working medium. In the hydraulic circuit arrangements 164, 166, there is furthermore a second overpressure valve 192, which connects the second fluid channel 174 on that side of the second lowering brake valve 182 which faces toward the piston-side working volume 160 of the hydraulic cylinder 154 to the overpressure port 188 in the presence of an overpressure of the hydraulic working medium.

The first working ports 168 and the second working ports 172 of the hydraulic circuit arrangements 164, 166 of the actuating elements 92, 94, 96, 98, 100 are connected to a control block 194. The overpressure port 188 of the hydraulic circuit arrangements 164, 166 communicates in this case with a tank 195 for the hydraulic fluid in the large manipulator.

The hydraulic circuit arrangements 164 of the actuating elements 92, 94 comprise, by contrast to the hydraulic circuit arrangements 166, a bypass valve 196, which bypass valve, in a first switching state, connects the first fluid channel 170 to the first working port 168 for the feed or discharge of the hydraulic fluid, and in so doing separates the first fluid channel 170 from the second fluid channel 174. In a second switching state which differs from the first switching state, the bypass valve 196 connects the first fluid channel 170 on that side of the second lowering brake valve 182 which is averted from the piston-side working volume 160 to the second fluid channel 174, and in so doing separates the first fluid channel 170 from the first working port 168 for the feed or discharge of the hydraulic working medium. The bypass valve 196 in the hydraulic circuit arrangements 164 of the actuating elements 92, 94 has in each case one electric drive 198 for the setting of the first switching state and of the second switching state. The bypass valve 196 is mechanically preloaded in the first switching state.

It is to be noted that, in a modified embodiment of the hydraulic circuitry with hydraulic circuit arrangements for driving the hydraulic drive units, provision may be made for the throttle cross section of the throttle integrated into the lowering brake valves 178, 182 to be designed to be adjustable and to be set in a manner dependent on the switching state of the bypass valve 196 such that the throttle cross section of the throttle integrated into the lowering brake valves 178, 182 is smaller in the first switching state of the bypass valve 196 than in the second switching state of the bypass valve 196, if the lowering brake valves 178, 182 have been switched into the first switching state. In this way, it can be achieved that the preloading of the hydraulic fluid that emerges from the piston-side or rod-side working volume 160, 162 does not increase or increases only a small amount if the bypass valve 196 connects the first fluid channel 170 on that side of the second lowering brake valve 182 which is averted from the piston-side working volume 160 to the second fluid channel 174, and in so doing separates the first fluid channel 170 from the first working port 168 for the feed or discharge of the hydraulic working medium.

It is also to be noted that, in a further modified embodiment of the hydraulic circuitry with hydraulic circuit arrangements for driving the hydraulic drive units, it is also possible for a bypass valve to be provided in all or only some of the hydraulic circuit arrangements provided there, or to be provided, in relation to the circuitry of FIG. 4, in hydraulic circuit arrangements 164 other than those shown there.

The operating state acquisition devices 130, 134, 138, 142 and 146 designed as pressure transducers acquire the hydraulic pressure in each case in a portion of the first fluid channel 170 which is open to the rod-side working volume 162 of the hydraulic cylinder 154. By means of the further operating state acquisition devices 132, 136, 140, 144 and 148 designed as pressure transducers, the hydraulic pressure in a portion of the second fluid channel 174 which is open to the piston-side working volume 160 of the hydraulic cylinder 154 is acquired.

Figure 5:
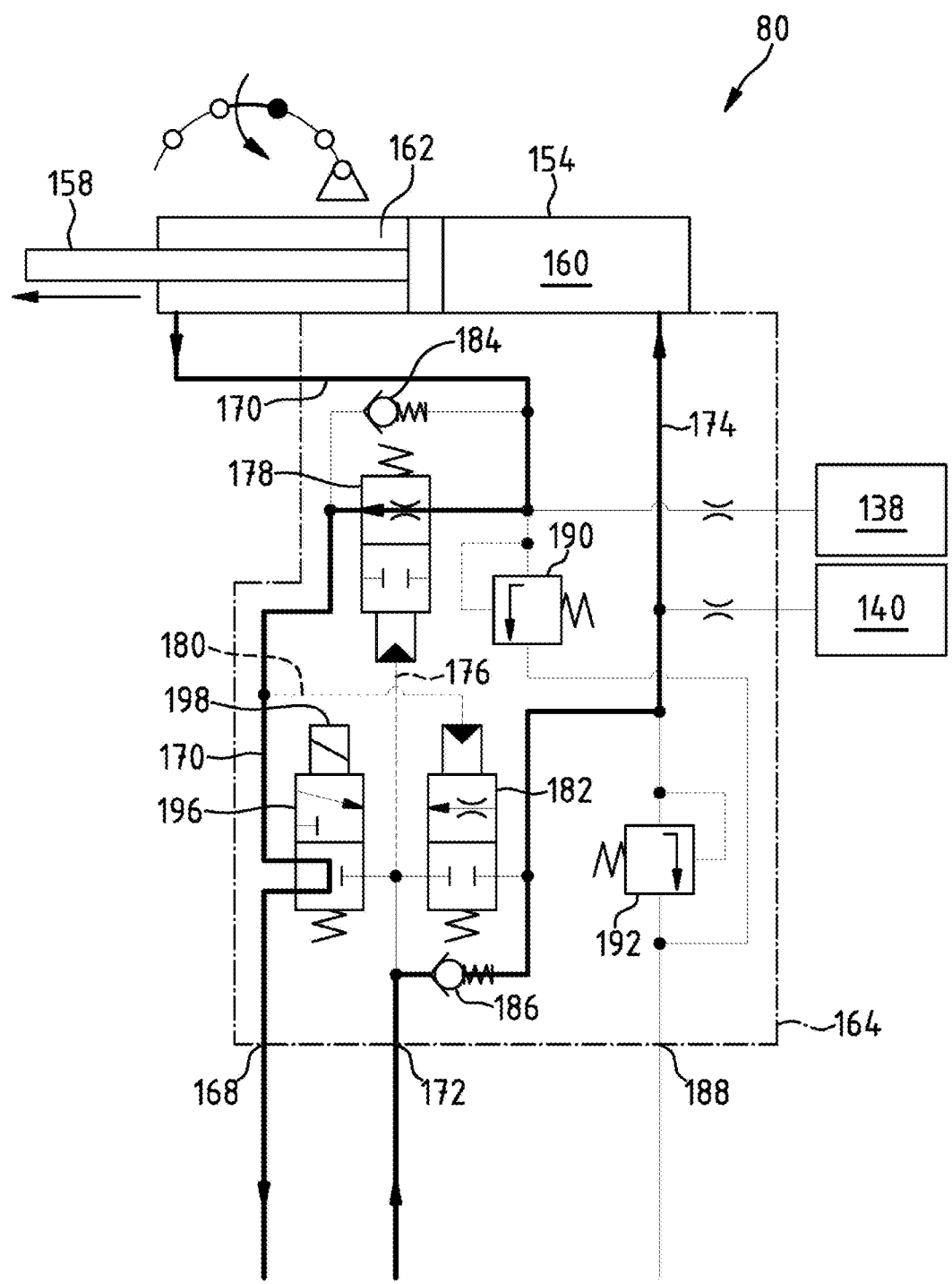
FIG. 5 shows a hydraulic circuit arrangement of FIG. 4 in a first switching state during the deployment of a hydraulic cylinder.
Figure 6:
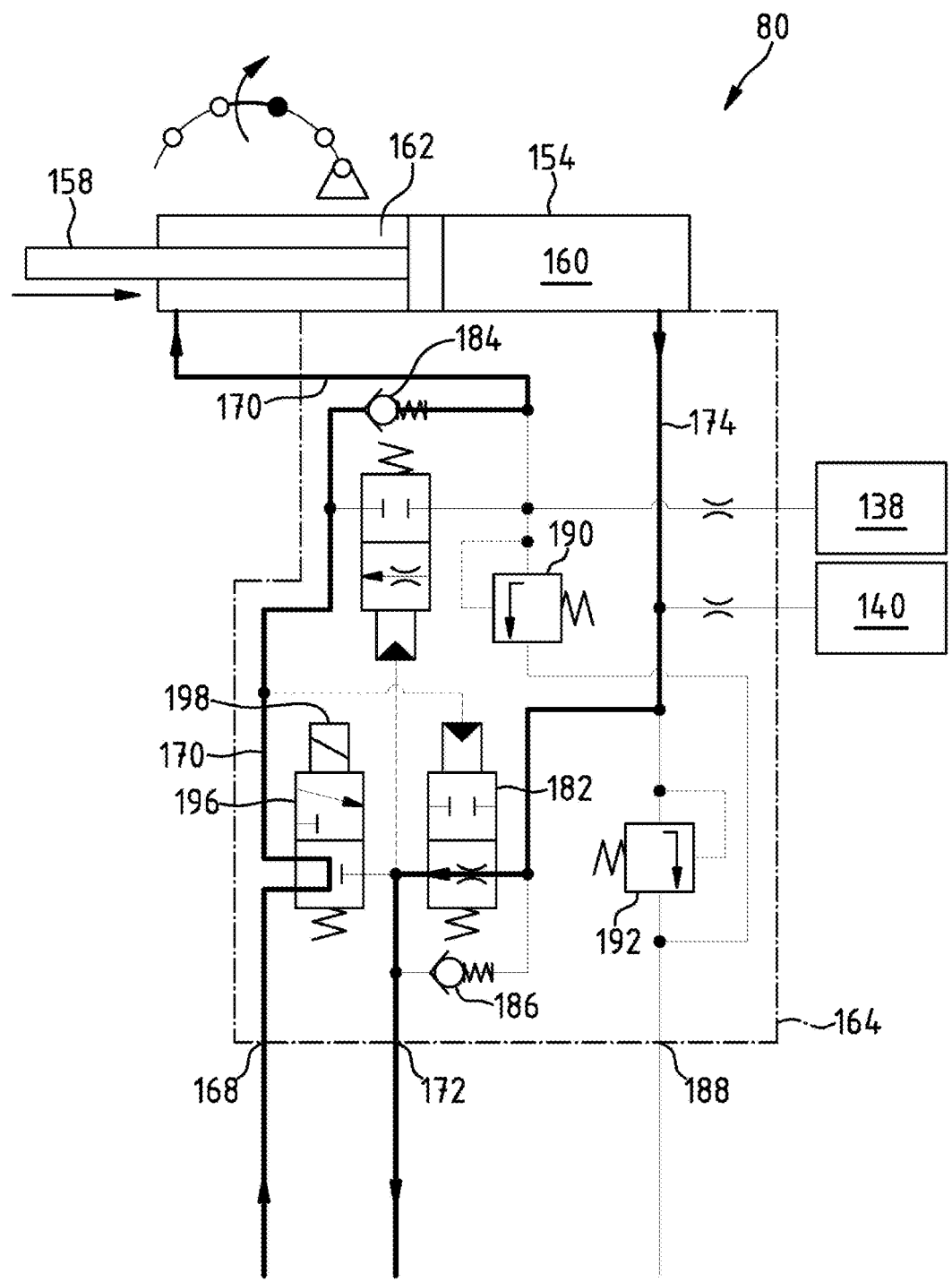
FIG. 6 shows the hydraulic circuit arrangement of FIG. 5 in the first switching state during the retraction of the hydraulic cylinder.
Figure 7:
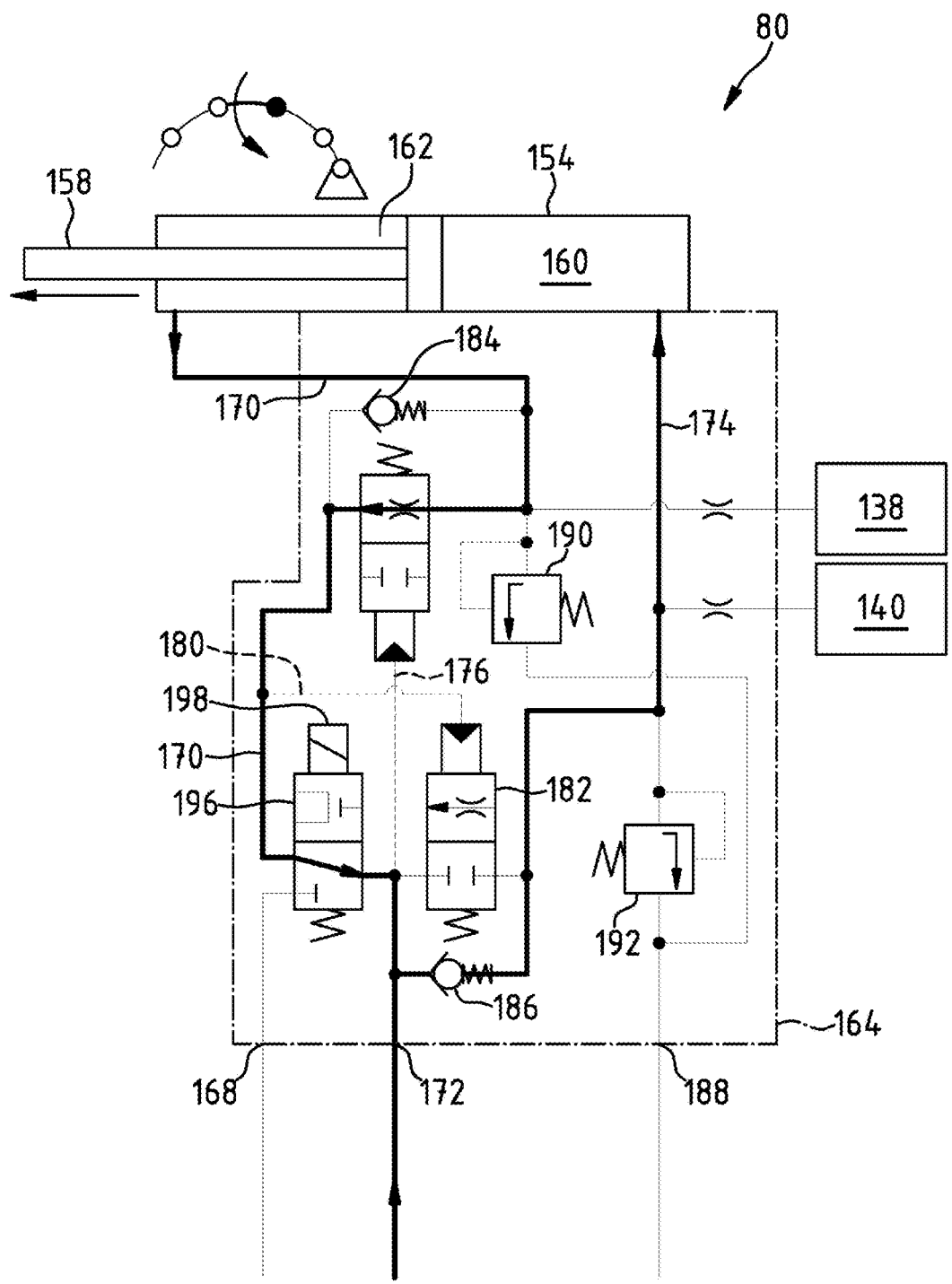
FIG. 7 shows the hydraulic circuit arrangement of FIG. 5 in a second switching state during the deployment of the hydraulic cylinder.

FIG. 5 shows a hydraulic circuit arrangement 164 during the deployment of the hydraulic cylinder 154 in the drive unit 80 if the bypass valve 196 has been switched into the first switching state. FIG. 6 shows the hydraulic circuit arrangement 164 during the retraction of the hydraulic cylinder 154, likewise if the bypass valve 196 is situated in the first switching state. FIG. 7 shows the hydraulic circuit arrangement 164 during the deployment of the hydraulic cylinder 154 if the bypass valve 196 has been switched into the second switching state.

By means of the control device 86, the electric drive 198 for setting the first switching state and the second switching state of the bypass valve 196 is controlled in a manner dependent on the operating state variables, acquired by means of the operating state acquisition devices, of the large manipulator in the form of the rod-side pressure $p_{si}$, i=130, 134, 138, 142, 146 and the piston-side pressure $p_{Ki}$, i=132, 136, 140, 144, 148 of the hydraulic fluid in hydraulic cylinders 154 and the joint angles $\varepsilon_i$, i=34, 36, 38, 40, 42 (FIG. 2) about the joint axes 54, 56, 58, 60, 62 of the articulated boom. For this purpose, in the activation assembly 89, the mechanical loading of the hydraulic drive units 68, 78, 80, 82 and 84 is determined from the acquired operating state variables. Then, in accordance with the determined mechanical loading, the bypass valve 196 is switched into the first or the second switching position. In this way, it can be achieved that, for the adjustment of the boom arms 44, 46, 48, 50 and 52 of the articulated boom in the large manipulator, less hydraulic fluid is conveyed by means of a hydraulic pump in the case of a low mechanical loading of the hydraulic drive units 68, 78, 80, 82 and 84 in the large manipulator than is required for the adjustment of the boom arms 44, 46, 48, 50 and 52 in the large manipulator in the case of a high mechanical loading of the hydraulic drive units 68, 78, 80, 82 and 84.

It is to be noted that, in a modified embodiment of the above-described large manipulator, provision may alternatively or additionally be made whereby, as an operating state variable of the large manipulator, an articulated boom movement state, an articulated boom posture, an articulated boom loading, a mechanical loading of a boom arm of the articulated boom and/or a concrete pump operating state is acquired by means of an operating state acquisition device in the control device 86, in order to set the switching position of the bypass valve 196 in a manner dependent on the acquired operating state variable by means of the control device 86.

In summary, it is possible in particular to firmly state the following preferred features of this disclosure: this disclosure relates to a large manipulator for concrete pumps, having a boom pedestal 30 which is arranged on a frame 16 and which is rotatable about a vertical axis of rotation 18, having an articulated boom 32 which is made up of at least two boom arms 44, 46, 48, 50, 52 and which bears a concrete conveying line 22, and having at least one hydraulic drive unit 26 for pivoting at least one of the boom arms 44, 46, 48, 50, 52 about a horizontal axis of rotation 18, which at least one hydraulic drive unit has a hydraulic cylinder 154 and a piston 156 which is arranged movably in the hydraulic cylinder 154 and which has a piston rod 158 connected thereto. Here, in the hydraulic cylinder 154, there are formed a piston-side working volume 160, which can be charged with hydraulic fluid, and a rod-side working volume 162, which can be charged with hydraulic fluid. According to this disclosure, the large manipulator comprises a hydraulic circuit arrangement 164, 166 for driving the at least one hydraulic drive unit 26, which hydraulic circuit arrangement, in a first switching state, connects a first working port 168 for the feed or discharge of the hydraulic fluid by means of a first fluid channel 170 to the rod-side working volume 162 and a second working port 172 for the feed or discharge of the hydraulic fluid by means of a second fluid channel 174 to the piston-side working volume 160, and which hydraulic circuit arrangement, in a second switching state which differs from the first switching state, separates the first working port 168 from the first fluid channel 170 and in so doing connects the first fluid channel 170 to the second fluid channel 174 for the feed of hydraulic fluid from the rod-side working volume 162 into the piston-side working volume 160.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE DESIGNATIONS

10 Mobile concrete pump
12 Transport vehicle
14 Thick matter pump
16 Frame fixed to the vehicle
18 Axis of rotation (vertical axis)
20 Distributor boom
22 Concrete conveying line
24 Feed hopper
25 Concreting location
26 Drive unit
28 Rotary joint
30 Boom pedestal
32 Articulated boom
34, 36, 38, 40, 42 Articulated joints
44, 46, 48, 50, 52 Boom arms
54, 56, 58, 60, 62 Joint axes
64 Boom arm location, for example boom tip
66 End hose
68 Drive unit
78, 80, 82, 84 Drive unit
83 Operator control element
85 Control assembly
86 Control device
87 Control unit
89 Activation assembly
90, 92, 94, 96, 98, 100 Actuating elements
91 Radio path
91 Radio receiver
91 Bus system
116 Operating state acquisition device
118, 120, 122, 124, 126, 129, 199 Angle sensor
128 Device for determining the angle of rotation
130, 132, 134, 136, 138, 140, 142, 144, 146, 148 Operating state acquisition device
150 Torque sensor
152 Input routine
154 Hydraulic cylinder
155 Processing routine
156 Piston
158 Piston rod
160 Piston-side working volume
161 Output routine
162 Rod-side working volume
164, 166 Circuit arrangement
168 First working port 170 First fluid channel
172 Second working port
174 Second fluid channel
176, 180 Pressure control line
178 First lowering brake valve
182 Second lowering brake valve
184 First check valve
186 Second check valve
188 Overpressure port
190 First overpressure valve
192 Second overpressure valve
194 Control block
195 Tank
196 Bypass valve
198 Electric drive
$p_{Ki}$ Piston-side pressure
$p_{Si}$ Rod-side pressure
S Control signal
$SW_i$ Actuating signal
$\varepsilon_i$ Angle

What is claimed is:

1. A manipulator for concrete pumps, comprising:
   a boom pedestal arranged on a frame and rotatable about a vertical axis;
   an articulated boom having at least two boom arms and bearing a concrete conveying line;
   a hydraulic drive configured for pivoting at least one of the boom arms about a horizontal axis of rotation;
   the hydraulic drive having a hydraulic cylinder and a piston movably arranged therein, the piston having a piston rod connected thereto, the hydraulic cylinder having a piston-side working volume configured to be charged with hydraulic fluid and a rod-side working volume configured to be charged with hydraulic fluid;
   a hydraulic circuit configured for driving the hydraulic drive, wherein:
      in a first switching state, the hydraulic circuit connects a first working port for the feed or discharge of the hydraulic fluid via a first fluid channel to the rod-side working volume and a second working port for the feed or discharge of the hydraulic fluid via a second fluid channel to the piston-side working volume;
      in a second switching state, the hydraulic circuit separates the first working port from the rod-side working volume and thereby connects the first fluid channel to the second fluid channel for the feed of hydraulic fluid from the rod-side working volume into the piston-side working volume;
   at least one sensor configured for acquiring at least one operating state variable of the manipulator, the at least one operating state variable being one of articulated boom posture and angular position of a boom arm; and
   an activation assembly in communication with the at least one sensor and configured for setting the switching state of the hydraulic circuit as a function of the at least one operating state variable.

2. The manipulator as claimed in claim 1, wherein the at least one operating state variable further includes one of articulated boom posture, angular position of a boom arm, articulated boom movement state, articulated boom loading, loading of a boom arm of the articulated boom, concrete pump operating state, hydraulic pressure in the rod-side working volume of the hydraulic cylinder of the hydraulic drive, and hydraulic pressure in the piston-side working volume of the hydraulic cylinder.

3. The manipulator as claimed in claim 1, wherein the at least one sensor further includes a pressure transducer for acquiring the hydraulic pressure in a portion of the first fluid channel which is open to the rod-side working volume of the hydraulic cylinder.

4. The manipulator as claimed in claim 3, wherein the at least one sensor further includes a sensor configured to acquire the hydraulic pressure in a portion of the second fluid channel which is open to the piston-side working volume of the hydraulic cylinder.

5. The manipulator as claimed in claim 1, wherein the hydraulic circuit further comprises:
   a first lowering brake valve hydraulically activated by a first pressure control line which communicates with the second working port, the first lowering brake valve being preloaded into a first switching position in which the first fluid channel is opened if the hydraulic pressure in the first pressure control line exceeds a threshold value, the first lowering brake valve having a second switching position in which the first fluid channel is shut off if the hydraulic pressure in the pressure control line falls below the threshold value;
   a first check valve arranged in parallel with respect to the first lowering brake valve and which prevents the backflow of hydraulic fluid out of the rod-side working volume of the hydraulic cylinder;
   a second lowering brake valve hydraulically activated by a further pressure control line which communicates with the first fluid channel and wherein the first lowering brake valve is disposed in the first fluid channel between the further pressure control line and the rod-side working volume, the second lowering brake valve being preloaded into a first switched position in which the second fluid channel is opened if the hydraulic pressure in the further pressure control line exceeds a threshold value, the second lowering brake valve having a second switched position in which the second fluid channel is shut off if the hydraulic pressure in the further pressure control line falls below the threshold value; and
   a second check valve arranged in parallel with the second lowering brake valve and which prevents the backflow of hydraulic fluid out of the piston-side working volume of the hydraulic cylinder to the second working port; and
   a bypass valve having a first switching state in which the first fluid channel is connected to the first working port and thereby separates the first fluid channel from the second fluid channel, and, when the bypass valve is in the second switching state, the bypass valve connects the first fluid channel to the second fluid channel at a location on the second fluid channel such that the second lowering brake valve and the second check valve are disposed between the bypass valve and the piston-side working volume.

6. The manipulator as claimed in claim 5, wherein the bypass valve has a drive for the setting of the first switching state and of the second switching state.

7. The manipulator as claimed in claim 6, wherein the bypass valve is preloaded into the first switching state.

8. The manipulator as claimed in claim 1, further comprising:
   an overpressure port;
   a first overpressure valve connecting a portion of the first fluid channel which is open to the rod-side working volume of the hydraulic cylinder to the overpressure port in the presence of an overpressure of the hydraulic working medium; and a second overpressure valve connecting a portion of the second fluid channel which is open to the piston-side working volume of the hydraulic cylinder to the overpressure port in the presence of an overpressure of the hydraulic working medium.

9. A method for operating a manipulator for a concrete pump having a boom pedestal arranged on a frame, an articulated boom having at least two boom arms and bearing a concrete conveying line, and a hydraulic drive configured for pivoting at least one of the boom arms about a horizontal axis of rotation, the hydraulic drive having a hydraulic cylinder that has a rod-side working volume that can be charged with hydraulic fluid via a first fluid channel and a piston-side working volume that can be charged with hydraulic fluid via a second fluid channel, the method comprising:

acquiring an operating state variable of the manipulator, the operating state variable being articulated boom posture or angular position of a boom arm; and setting the switching state of a bypass valve as a function of the acquired operating state variable, wherein the bypass valve, in a first switching state (i) connects the first fluid channel to a first working port for the feed or discharge of the hydraulic fluid, and separates the first fluid channel from the second fluid channel, or, in a second switching state (ii) connects the first fluid channel to the second fluid channel and separates the first fluid channel from the first working port for the feed or discharge of the hydraulic working medium.

10. The manipulator as claimed in claim 1, further comprising a bypass valve having a first switching state wherein the bypass valve connects the first working port to the rod-side working volume and separates the first fluid channel from the second fluid channel and a second switching state wherein the bypass valve separates the first working port from the rod-side working volume and connects the rod-side working volume to the second fluid channel for the feed of hydraulic fluid from the rod-side working volume into the piston-side working volume; and wherein the activation assembly sets the switching state of the hydraulic system by setting the switching state of the bypass valve.

11. The method as claimed in claim 9, further comprising the step of acquiring a second operating state variable of the manipulator for use in determining the setting of the switching state of the bypass valve wherein the second operating state variable is one of articulated boom posture, angular position of a boom arm, articulated boom movement state, articulated boom loading, loading of a boom arm of the articulated boom, concrete pump operating state, hydraulic pressure in the rod-side working volume of the hydraulic cylinder of the hydraulic drive, and hydraulic pressure in the piston-side working volume of the hydraulic cylinder.

* * * * *